(12) United States Patent
Parker et al.

(10) Patent No.: US 6,194,881 B1
(45) Date of Patent: Feb. 27, 2001

(54) SWITCHING POWER SUPPLY FOR LOWERED DISTRIBUTION SYSTEM DISTURBANCE

(75) Inventors: Francis J. Parker, Cooper City; Steven R. Maitin, Lake Worth, both of FL (US)

(73) Assignee: NMB (USA), Inc, Chatsworth, CA (US)

( * ) Notice: Subject to any disclaimer, the term of this patent is extended or adjusted under 35 U.S.C. 154(b) by 0 days.

(21) Appl. No.: 09/313,247

(22) Filed: May 17, 1999

(51) Int. Cl.[7] .............................. G05F 1/10; G05F 1/40; G05F 1/455
(52) U.S. Cl. .......................... 323/237; 323/239; 323/902
(58) Field of Search ............................. 323/237, 320, 323/902, 239, 324

(56) References Cited

U.S. PATENT DOCUMENTS

| | | | |
|---|---|---|---|
| 3,387,205 | 6/1968 | Tesdall | 318/434 |
| 3,473,106 | 10/1969 | Grabl | 323/277 |
| 3,487,231 | 12/1969 | Dixon, Jr. | 367/113 |
| 3,978,393 | 8/1976 | Wisner et al. | 323/272 |
| 4,257,090 | 3/1981 | Kröger et al. | 323/222 |
| 4,349,879 | 9/1982 | Peddie et al. | 307/35 |
| 4,386,311 | 5/1983 | Bafaro | 363/21 |
| 4,478,468 | 10/1984 | Schoen et al. | 315/194 |
| 4,528,494 | 7/1985 | Bloomer | 323/273 |
| 4,544,863 | * 10/1985 | Hashimoto | 315/209 R |
| 4,564,895 | 1/1986 | Glennon | 363/132 |
| 4,567,425 | * 1/1986 | Bloomer | 323/237 |
| 4,825,144 | 4/1989 | Alberkrack et al. | 363/71 |
| 5,004,969 | * 4/1991 | Schanin | 323/235 |
| 5,010,279 | 4/1991 | Lathom et al. | 315/240 |
| 5,072,170 | * 12/1991 | Crane et al. | 323/235 |
| 5,329,223 | 7/1994 | Riggio | 323/246 |
| 5,365,157 | 11/1994 | Geller et al. | 323/319 |
| 5,373,224 | 12/1994 | Rabier et al. | 323/244 |
| 5,455,491 | * 10/1995 | Hajagos et al. | 315/291 |

* cited by examiner

Primary Examiner—Peter S. Wong
Assistant Examiner—Bao Q. Vu
(74) Attorney, Agent, or Firm—Amster, Rothstein & Ebenstein; Donna Angotti (57) ABSTRACT

A switching power supply system is disclosed for powering electrical equipment while minimizing disturbance to an AC power line source. The system includes first and second AC switches which are operated at alternate intervals with respect to each other to permit current to flow between the AC power line source and the load over intervals of the AC voltage cycle. An energy storage element is included in an output filter and stores energy during intervals of the AC voltage cycle and releases the stored energy during the alternate intervals of the AC voltage cycle. By the disclosed switching power supply, the voltage applied to the load and the current flow between the source and the load are sinusoidal, have minimal energy in frequencies other than the fundamental AC power line frequency, have minimal harmonic distortion, result in a power factor close to unity, and are steady and non fluctuating.

19 Claims, 6 Drawing Sheets

SWITCHING POWER SUPPLY FOR LOWERED DISTRIBUTION SYSTEM DISTURBANCE

FIELD OF THE INVENTION

The present invention relates to a switching power supply for controlling the amount of power supplied to a load from an alternating current (AC) power source and more specifically to a switching power supply for reducing disturbance to the AC power distribution system.

BACKGROUND OF THE INVENTION

Recently, more stringent standards have been proposed which seek to limit the level at which power-consuming devices are permitted to introduce noise, power frequency harmonics, or other disturbance onto the AC power line as a result of their operation. The IEC555-2 and IEC555-3 standards were initiated by the IEC, amended, approved, renumbered as EN60555-2 and EN60555-3, and implemented by CENELEC for use by members of the European Union. The EN60555-2 and EN60555-3 standards have more recently been updated and renumbered as EN61000-3-2 and EN61000-3-3. All of these standards will be collectively called the "IEC555 Standard". The IEC555 Standard regulates the effects of the power draw of the load upon the current and voltage characteristics of the AC power line. Herein, the term disturbance is used to refer to any of the above-identified effects, as well as one or more of the following: increased average or root mean squared (rms) line current, reduced power factor, and distortions of the AC line voltage, including flattening of the peak voltage levels and/or periodic changes that would cause a visual flicker of the lighting. These specific types of disturbance to the AC power line voltage and current are known to be present when existing electrical equipment such as computers, audio-visual reproduction and recording equipment, lamp dimmers, motor drives, electronic ballast lights, and photo-copying equipment, among others, are powered from an AC power line source.

Figure 6A:
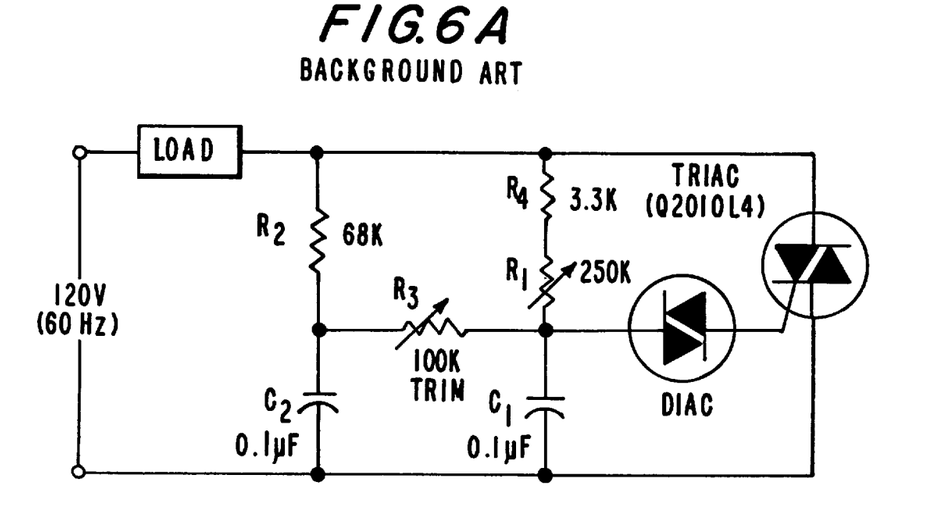
FIG. 6A shows a prior circuit having thyristor AC phase control.

Prior to the invention disclosed herein, no system known to the inventors was capable of supplying variable power from an AC power line source to a resistive AC load that could also meet the requirements of the IEC555 Standard for minimizing disturbance to the AC power line voltage and current. A system in use prior to the proposal of the IEC555 Standard is known as thyristor AC phase control. An example of such system is described in U.S. Pat. No. 5,373,224 to Rabier ("the Rabier Patent"). A further example is shown in FIG. 6A of an extended range full wave phase control circuit. In these types of systems, which may commonly be used in photocopiers, lamp dimmers, heater controls and cooking appliances, a triac placed between the AC power line and the load is "fired", i.e. switched on, at some delay relative to the start of each half cycle of the AC power line voltage, such that power is supplied to the load during only a predetermined portion of each half cycle of the AC line voltage. In that way, the triac controls delivery of power to the load in accordance with the relative proportion of each AC power cycle in which the triac is switched on.

However, while prior triac-controlled switching power supplies are capable of meeting the voltage fluctuating requirements of the IEC555-3 (now EN61000-3-3) standard, they are incapable of meeting the harmonic requirements of IEC555-2 (now EN61000-3-2) standard because the voltage and current waveforms supplied to the load are not sinusoidal at substantially a single frequency.

Figure 6B:
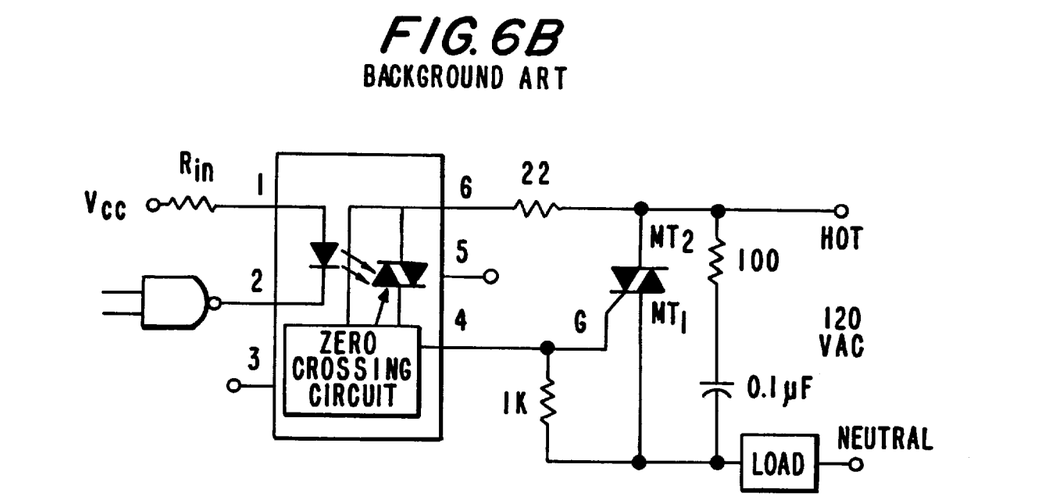
FIG. 6B shows a prior circuit having a slowly modulated triac control.

An alternate method of controlling the triac-controlled power supply is to switch it on for several cycles and then off for several cycles, resulting in a very slow modulation frequency. An example of such a system is shown in FIG. 6B employing a solid state relay with zero crossing turn on. The circuit of FIG. 6B is similar to that of FIG. 6A, however, it can be controlled by a computer. Accordingly, the triac can be on for extended periods of time and is slowly modulated on and off to control the average power. Although this method, which is currently in use for many heater type applications in the electronics industry such as photocopiers meets the harmonic distortion requirements, it does not meet the fluctuating voltage restrictions and causes visual flicker to the lighting. Accordingly, it fails the standard IEC555-3 (now EN6100-3-3).

Figure 1:
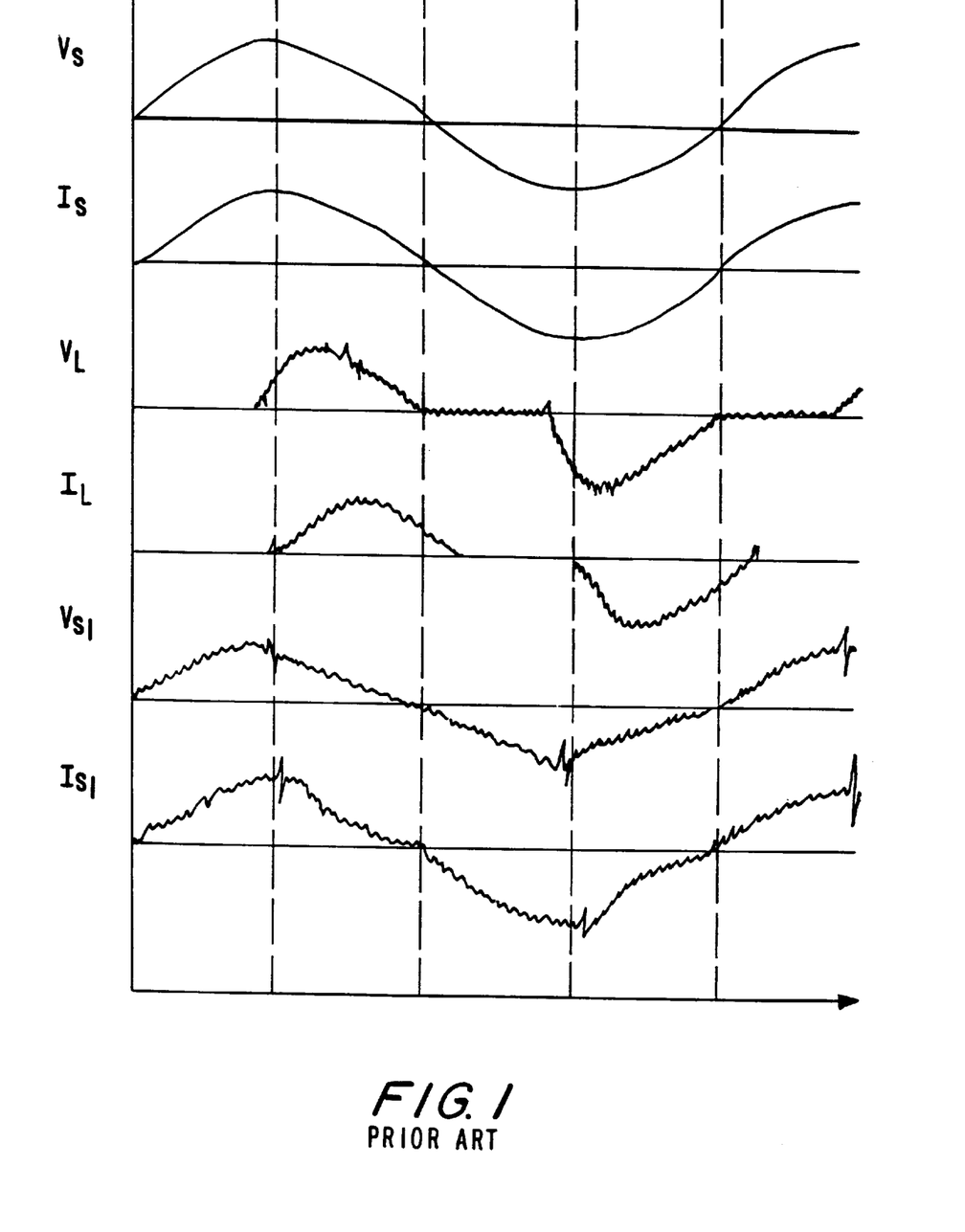
FIG. 1 shows an example of voltage and current waveforms at the input and output of a prior art switching power supply.

FIG. 1 contains a set of waveforms plotted versus time for 1) the voltage Vs and current Is on an AC power line with minimal disturbance present; 2) the voltage VL and current IL as supplied to a load through a prior triac-controlled supply; and 3) an example of the AC power line voltage Vs1 and current Is1 under disturbed conditions, i.e. as voltage and current being supplied to the load by the triac-controlled power supply. As shown in FIG. 1, irregular, non-sinusoidal voltage and current are supplied to the load as waveforms VL and IL The irregular current draw, in turn, disturbs the AC power line characteristics, resulting in the disturbed voltage and current waveforms Vs1 and Is1.

Like the prior thyristor AC phase control system, the present invention is designed to supply power to AC loads used in photocopiers, lamp dimmers, heater controls, cooking appliances, and many other types of equipment which draw sinusoidal AC power. The present invention operates to minimize the level of disturbance to the AC power line while providing variable AC power to a load and meeting the requirements of the IEC555 standard.

Accordingly, it is an object of the present invention to provide a switching power supply which delivers a controlled amount of power to an AC load from an AC power line while minimizing disturbance to the voltage and current which are carried by the AC power line.

A further object of the invention is to provide a switching power supply which draws power at timed cycle intervals from a source while delivering a continuous sinusoidal voltage and current to the load.

Another object of the invention is to provide a switching power supply which draws power at timed cycle intervals from a source while maintaining substantially sinusoidal voltage and current waveforms at the source.

Another object of the invention is to provide a switching power supply which provides power to an AC load at a modulation frequency substantially higher than the AC source frequency so that there will be no fluctuating distortion on the source that would create a visible flicker.

Still another object of the invention is to provide a more reliable switching power supply which contains few components.

A still further object of the invention is to provide a low-cost switching power supply for use with a full spectrum of consumer and business equipment.

SUMMARY OF THE INVENTION

These and other objects are provided by the switching power supply of the present invention. In a first preferred embodiment of the present invention, the switching power supply includes an AC switch which responds to a control input to permit current to flow bi-directionally between the power source and the load for a duration proportional to the power level needed. The switching frequency is several orders of magnitude higher than that of the AC line so as not to produce unwanted line distortion and to allow a sinusoidal voltage and current to be realized. The switching power supply further includes an energy storage element which stores energy during the period that the AC switch is closed and releases the stored energy to supply current bi-directionally to the load during the period that the AC switch is off and the load is blocked. The energy storage element preferably includes an inductor, but may include a capacitor instead of or in addition to the inductor. The storage element additionally provides filtering of the high switching frequency to reduce the switching frequency ripple and noise content at the load. The switching power supply further includes an electromagnetic interference (EMI) reducing filter as an input filter to prevent current flow between the source and the load from introducing noise frequencies and harmonics of the fundamental AC power line frequency onto the voltage and current waveforms of the AC power line.

Preferably, the switching power supply includes a second AC switch coupled to the energy storage element which is operated at alternate intervals with respect to the first AC switch. The first switch is turned on while the second switch is turned off to permit bi-directional current flow between the source and the load. The second switch is turned on when the first switch is turned off to permit bi-directional current to flow between the energy storage element and the load.

Preferably, the switching power supply includes modulation control circuits which could be implemented by, but not limited to, pulse width modulation (PWM), frequency modulation (FM), phase modulation (PM), or any suitable energy modulation technique. These control circuits will generate periodic pulse trains to control the operation of the first and second AC switches. In a preferred embodiment, a first train of pulses is generated to control the operation of the first AC switch and a second train of pulses is generated to control the operation of the second AC switch. The first and second pulse trains are preferably opposite in phase with respect to each other to activate each AC switch at alternate intervals. Preferably, the control circuits are controlled automatically in accordance with the power requirements of the load, e.g. via feedback control signals delivered from load system circuitry.

DETAILED DESCRIPTION OF THE PREFERRED EMBODIMENTS

FIG. 1 shows a set of waveforms plotted versus time for the following: 1) the voltage Vs and current Is on an AC power line source with minimal disturbance present; 2) the voltage VL and current IL as supplied to a load through a prior art triac controlled switching power supply; and 3) an example of the voltage Vs1 and current Is1 on an AC power line under disturbed conditions, e.g. when power is supplied to a load by the prior art triac controlled switching power supply having voltage and current characteristics as shown by the VL and IL waveforms.

As shown in FIG. 1, the voltage Vs and current Is on the AC power line with no disturbance present appear as sine curves having a single fundamental frequency at the power line frequency, e.g. a fixed frequency at 50 Hz, 60 Hz, or 400 Hz, etc. Ideally, the AC power line voltage Vs and current Is have no energy in frequencies other than the single fundamental frequency, such that there will be no energy in higher harmonics of the fundamental frequency, and no energy in other frequencies due to various sources of noise. If an AC power line is coupled to a load through a power modulation circuit that has the voltage VL and current IL characteristic shown in FIG. 1, disturbance is introduced onto the AC power line such that the voltage and current which remain on the AC power line more closely resemble the disturbed waveforms shown as Vs1 and Is1 in FIG. 1.

Figure 2:
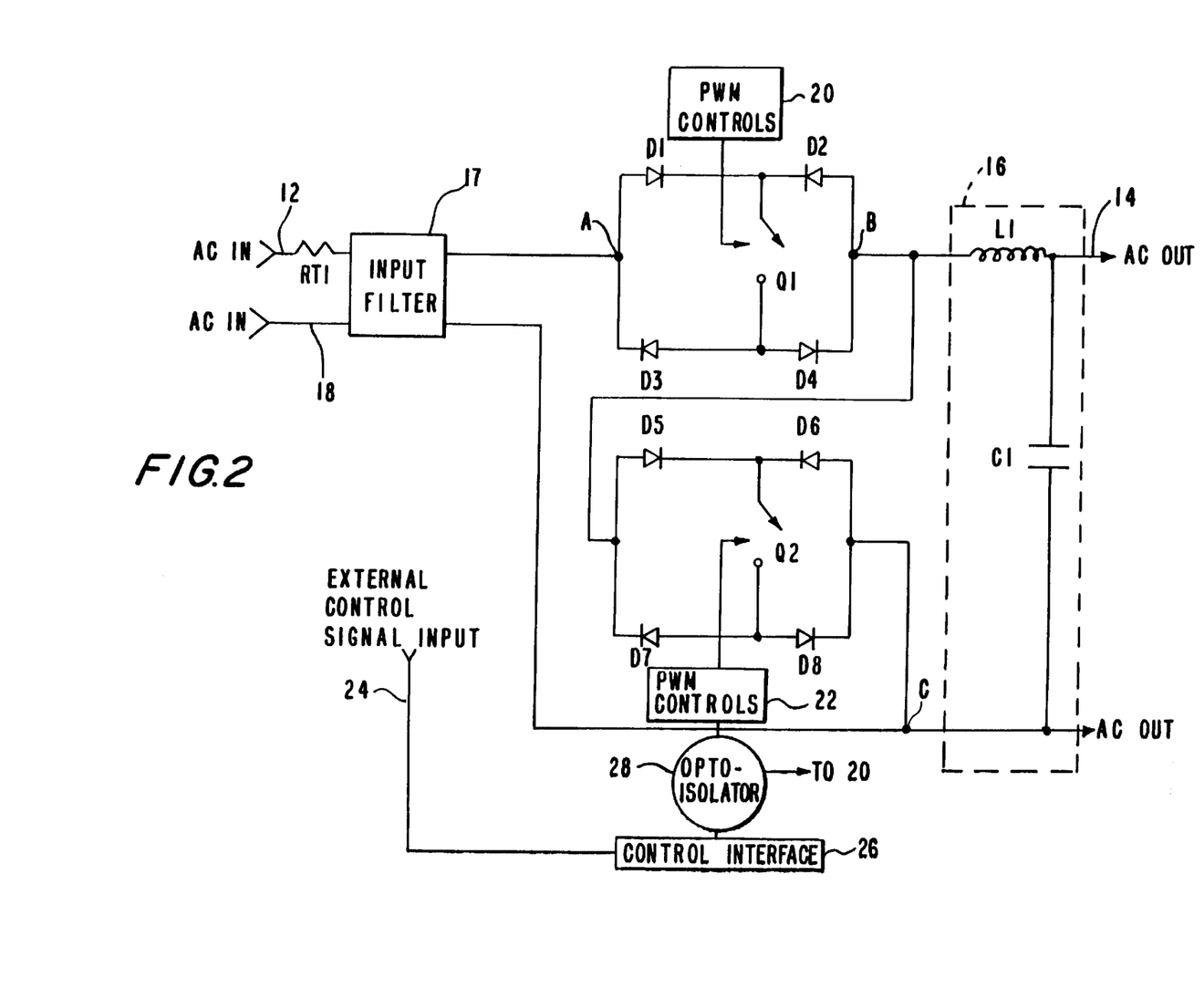
FIG. 2 shows a block and schematic diagram of the switching power supply of the present invention.

FIG. 2 is a block and schematic diagram showing the switching power supply of the present invention. As shown in FIG. 2, the switching power supply includes a first AC switch consisting of Q1, D1, D2, D3, & D4. This switch is used to conduct power from a first (variable potential) AC input line 12 to a first AC output line 14 through an output filter 16 during either a positive or negative portion of the half cycle of the AC power line voltage. A second AC switch which consists of Q2, D5, D6, D7, & D8 is used to permit the flow of current to be continuous between an energy storage element such as inductor L1 in output filter 16 and the load through output line 14 when switch element Q1 is turned off. First and second AC switch elements Q1 and Q2 can be of any one of many types of relatively fast switching voltage controlled or current controlled switches, such as bipolar junction transistors and field effect transistors, IGBTs, vacuum tubes, relays, etc., so long as their switching frequencies are at least one and preferably several orders of magnitude higher than the fundamental AC power line frequency. The first and second AC switches are coupled to the input lines of the source, i.e. a first (variable potential) AC input line 12 and a second (variable potential or common) AC input line 18, via an input filter 17 for reducing electromagnetic interference (EMI).

Output filter 16 serves to continue the flow of current between the source and the load during portions of the positive and negative half cycles of the AC power line voltage when switch element Q1 is turned off. For that purpose, output filter 16 includes an energy storage element shown representatively as inductor L1, and may also include a capacitor C1 which also serves as an energy storage element and/or for the purpose of eliminating rapid fluctuations in the voltage or current flow between the load and the energy storage element or the source. Capacitor C1 may also be used to correct for a phase lag between the voltage and the current supplied to the load.

Diodes D1–D8 permit current to flow only in a single direction in switch elements Q1 and Q2. Diodes D1 and D4 serve to permit the flow of current from AC input line 12 through connection point A to connection point B when switch element Q1 is turned on during a positive half cycle of the AC voltage, and diodes D2 and D3 serve to permit the flow of current from connection point B through connection point A to AC input line 12 when switch element Q1 is turned on during a negative half cycle of the AC voltage. When switch element Q1 is turned off and switch element Q2 is turned on during a positive half cycle of the AC voltage, diodes D6 and D7 permit the flow of current between inductor L1 of output filter 16 to the AC output line 14 to the load to the AC (common) input line 18 through connection points C to B. Likewise diodes D5 and D8 permit the flow of current between inductor L1 of output filter 16 through connection points B to C to the AC (common) input line 18 to the load to the AC output line 14 during a negative half cycle.

Pulse width modulation (PWM) circuits 20 and 22 generate controlled duration pulses, which in turn, control the duration and timing at which first and second source switch elements Q1 and Q2 are activated to permit current to flow between the source and the load. PWM control circuits 20 and 22 are controlled by an external control signal 24 which may be, for example, a reference voltage output of a potentiometer or a feedback control signal generated by load system circuitry to automatically control the amount of power delivered to the load. The external control signal 24 operates a control interface 26 to supply the signals required to operate PWM control circuits 20 and 22. An optical isolator 28 may also be used, as appropriate, to galvanically isolate the control signal 24 from the AC lines 12 and 18.

Figure 3:
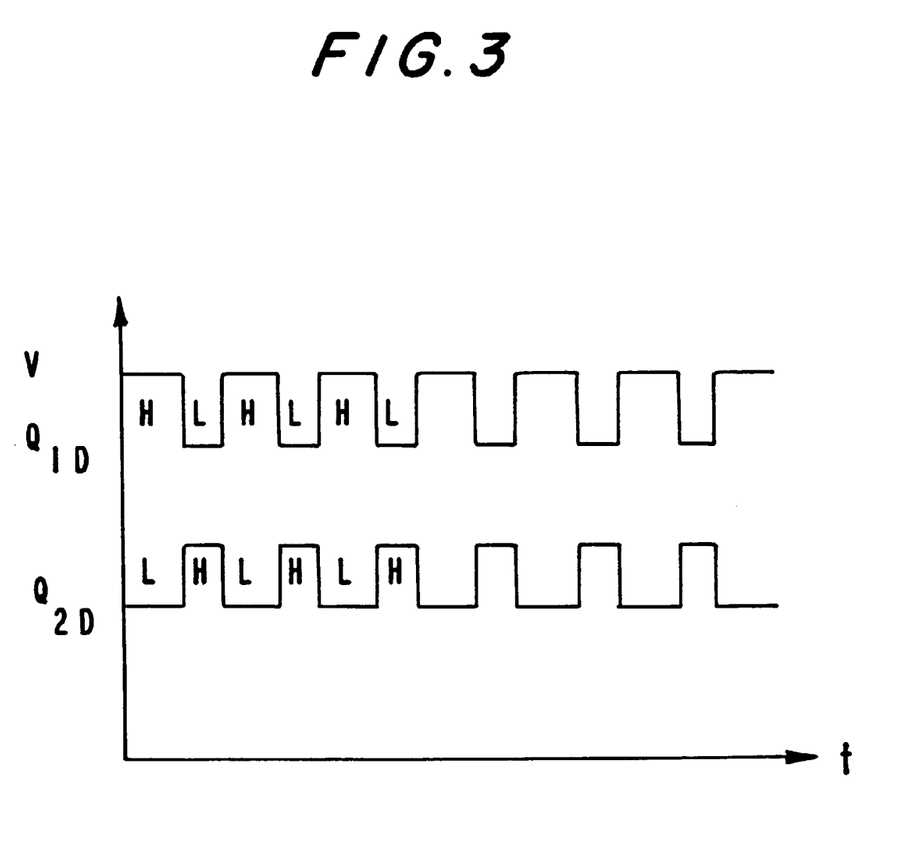
FIG. 3 shows an example of drive pulse trains used to operate the switching power supply shown in FIG. 2.

The construction of the switching power supply of the present invention having been described, attention will now be turned to its operation. FIG. 3 shows a pair of waveforms Q1D and Q2D which are output from PWM control circuits 20 and 22, respectively, and which are used to control the operation of first and second AC switch elements Q1 and Q2, respectively. The Q1D and Q2D waveforms are trains of pulses which vary between a first state L below the threshold for engaging switch elements Q1 and Q2 and a second state H at which switch elements Q1 and Q2 are engaged. The Q1D and Q2D waveforms are timed such that the Q1D waveform has the state H when the Q2D waveform has the state L and vice versa. Accordingly, the first and second AC switch elements Q1 and Q2 are operated such that whenever switch element Q1 is turned on, switch element Q2 is turned off, and whenever switch element Q2 is turned on, switch element Q1 is turned off.

Preferably, switch element Q1 is turned on by waveform Q1D multiple times during every AC voltage cycle, and switch element Q2 is turned on multiple times during the alternate portions of every AC voltage cycle. Hence, the preferred embodiment of the invention operates as follows for each cycle of the AC power line voltage. During a portion of the positive AC half cycle, switch element Q1 is turned on multiple times by an 'H' pulse of waveform Q1D to permit current to flow from the source to the load through AC input line 12 and AC output line 14 through diodes D1, D4 and switch element Q1. During the alternate portions of the same AC half cycle, switch element Q1 is turned off and switch element Q2 is turned on to permit current to flow from an energy storage element such as inductor L1 or capacitor C1 in output filter 16 to the load through output line 14 to the AC common 18 and back through diodes D6, D7 and switch element Q2 to the energy storage element. Next during a portion of the negative AC half cycle, switch element Q1 is again turned on multiple times by an 'H' pulse of waveform Q1D to permit current to flow from the load to the source through output filter 16, connection point B, diodes D2 and D3 and switch element Q1, connection point A and to AC input line 12 through input filter 17. During the alternate portions of the negative AC half cycle in which switch element Q1 is turned off and switch element Q2 is turned on, current is permitted to flow from a storage element such as inductor L1 or capacitor C1 in output filter 16 to connection point B, diodes D5 and D8 and switch element Q2 to connection point C to the load and back to connection point 14.

Figure 4:
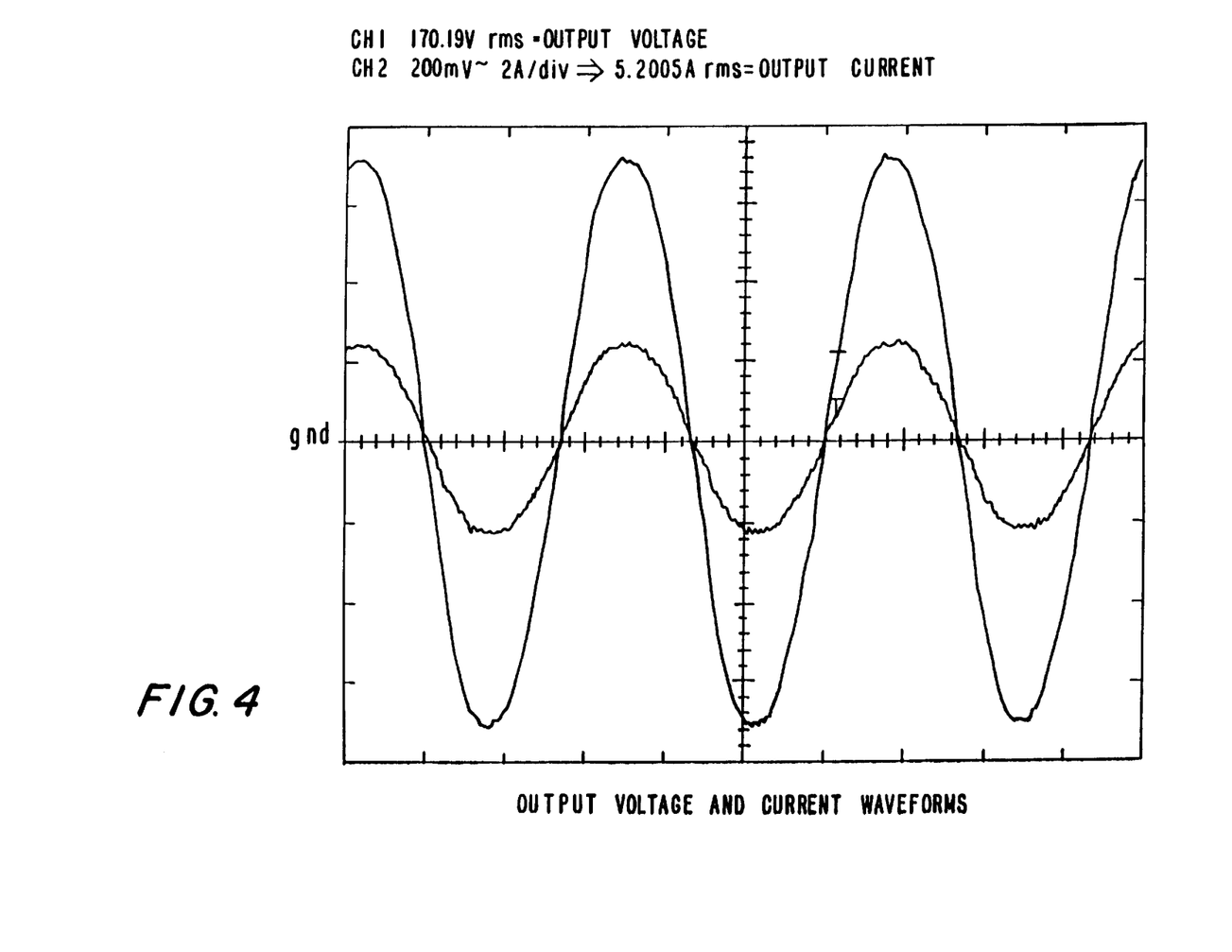
FIG. 4 shows an example of voltage and current waveforms supplied to a load from the output of the switching power supply shown in FIG. 2.

The voltage and current which appear at AC output line 14 and which are applied to the load by operation of the switching power supply of FIG. 2 have waveforms as shown in FIG. 4. As will be understood from an examination of FIG. 4, the voltage and current waveforms applied to the load by the switching power supply are sinusoidal at the fundamental AC power line frequency and have minimal energy in harmonic frequencies of the fundamental frequency, and minimal noise energy.

Figure 5:
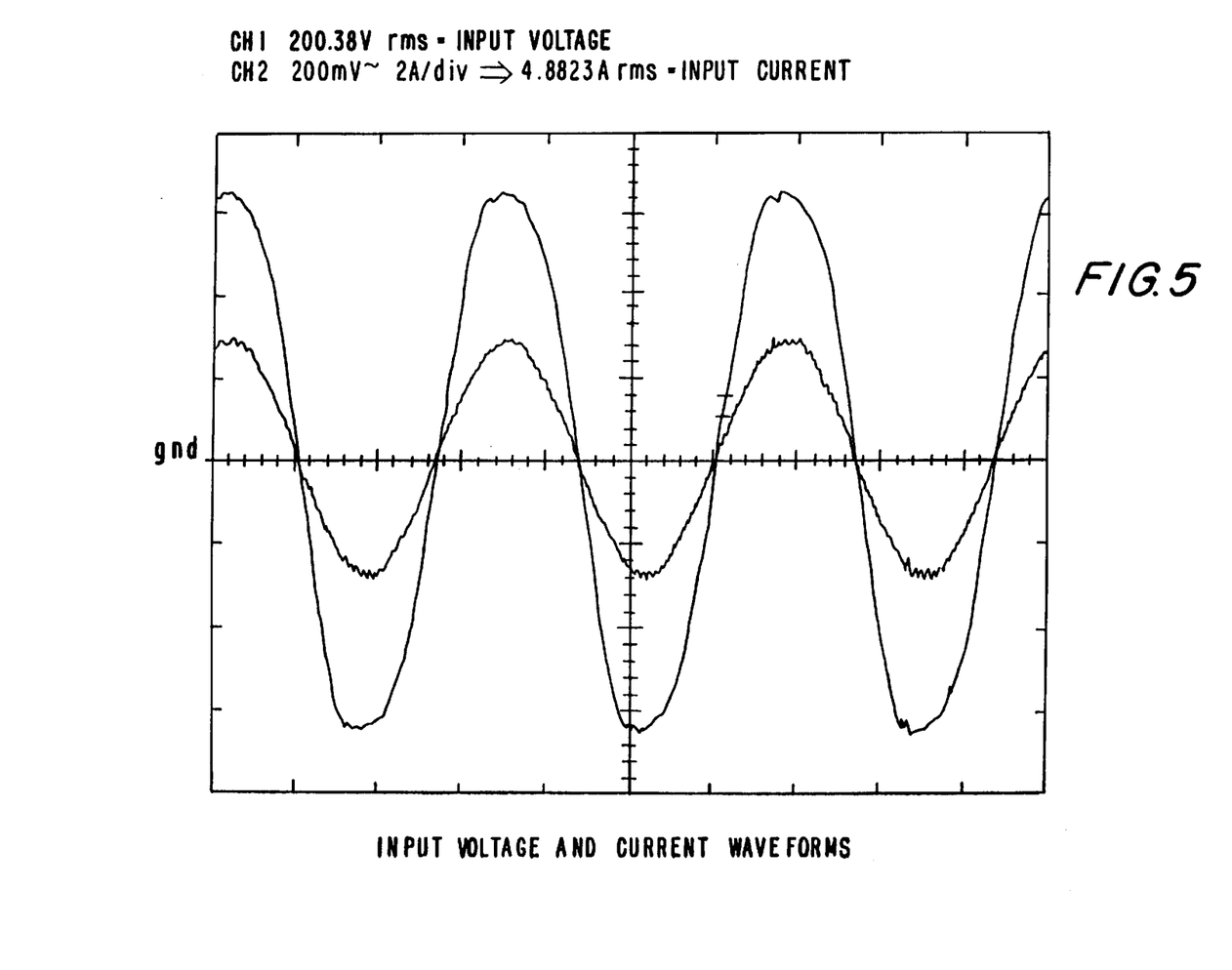
FIG. 5 shows an example of voltage and current waveforms of the AC power line source at the input of the switching power supply shown in FIG. 2 while power is being supplied to a load.

During operation of the switching power supply shown in FIG. 2 the voltage and current waveforms which appear on the AC input line 12 have waveforms as shown in FIG. 5. As will be understood from an examination of FIG. 5, the waveforms for the voltage and current of the AC power line source during operation of the switching power supply of FIG. 2 remain sinusoidal at the fundamental AC power line frequency and have minimal energy in harmonic frequencies of the fundamental frequency, and minimal noise energy. Accordingly, an examination of FIG. 5 shows that the switching power supply of the present invention meets its stated objective of controlling the power to an AC load while minimizing disturbances which could be coupled onto the AC power line source.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the present invention.

What is claimed is:

1. A switching power regulator for supplying current and voltage to a load from an alternating current (AC) power source having a periodic cycle, said switching power regulator comprising:

energy storage means; and switch means coupled to said power source for permitting current to flow between said power source and said load over portions of said cycle while permitting the storage of energy by said energy storage means during said portions of said cycle and for alternately interrupting the flow of current between said power source and said load and creating a current path for supplying power from said energy storage means to said load during alternate portions of said cycle.

2. The switching power regulator as recited in claim 1, wherein said switch means alternates between permitting current flow between said power source and said load and interrupting current flow between said power source and said load at a frequency much greater than the frequency of the alternating current power source.

3. The switching power regulator as recited in claim 1, including means for varying the power supplied to said load in accordance with a control signal.

4. The switching power regulator as recited in claim 3, wherein said means for varying the power supplied to said load varies the duty cycle of a signal that causes said switch means to alternate between permitting current to flow between said power source and said load and interrupting the current flow between said power source and said load.

5. The switching power regulator as recited in claim 3, wherein said means for varying the power supplied to said load varies the frequency of a signal that causes said switch means to alternate between permitting current to flow between said power source and said load and interrupting the current flow between said power source and said load.

6. The switching power regulator as recited in claim 1, wherein said switch means comprises a first switch that permits current to flow between said power source and said load when closed and which interrupts the flow of current between said power source and said load when opened.

7. The switching power regulator as recited in claim 6, further comprising a second switch that creates a current path in a first direction from said load to said energy storage means during said alternate portions of said cycle during a first time period and which creates a current path in a direction opposite said first direction from said energy storage means to said load during alternate portions of said cycle during a second time period.

8. The switching power regulator as recited in claim 1, further comprising an input filter coupled to said power source.

9. The switching power regulator as recited in claim 8, wherein said input filter regulates effects produced upon said power source by said flow of current from and to said load.

10. The switching power regulator as recited in claim 1, wherein said load receives alternating current having substantially sinusoidal waveforms.

11. The switching power regulator as recited in claim 7, wherein each of said first and second switches comprises four diodes and an electronic switch element.

12. The switching power regulator as recited in claim 3, wherein said means for varying the power supplied to said load comprises a modulated signal generator responsive to said control signal for providing a train of controlled pulses for operating said switch means.

13. The switching power regulator according to claim 12, wherein said modulated signal generator is coupled to said control signal through an isolator.

14. The switching power regulator as recited in claim 12, wherein said modulated signal generator has a frequency substantially greater than the frequency of the AC power source.

15. The switching power regulator as recited in claim 14, wherein said modulated signal generator varies a control parameter of pulses for operating said switch means to control the amount of power delivered to said load.

16. The switching power regulator as recited in claim 15, wherein said control parameter is the duty cycle.

17. The switching power regulator as recited in claim 15, wherein said control parameter is the frequency.

18. The switching power regulator as recited in claim 15, wherein said control parameter is phase.

19. A method for regulating the supply of current and voltage to a load from an alternating current (AC) power source having a periodic cycle comprising:
   permitting current to flow between said power source and said load over portions of said cycle while permitting the storage of energy in an energy storage means during said portions of said cycle; and
   alternately interrupting the flow of current of said power source and said load while creating a current path for supplying power from an energy storage means to said load during alternate portions of said cycle.

* * * * *